Dec. 27, 1960  W. A. GERRANS  2,966,253
VARIABLE SPEED DRIVE CONTROL FOR MATERIAL HANDLING
Filed Sept. 19, 1955  2 Sheets-Sheet 1
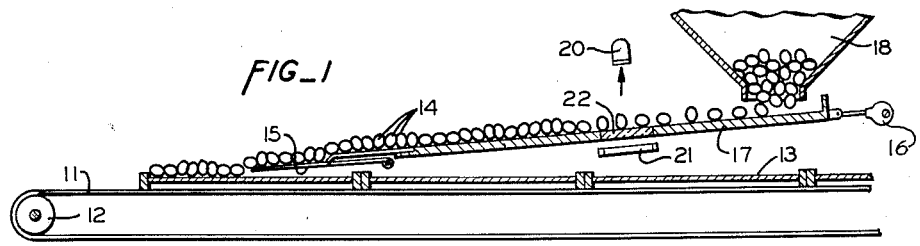
FIG_1
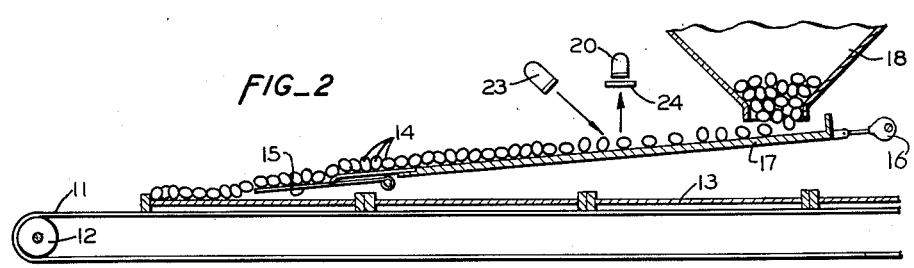
FIG_2
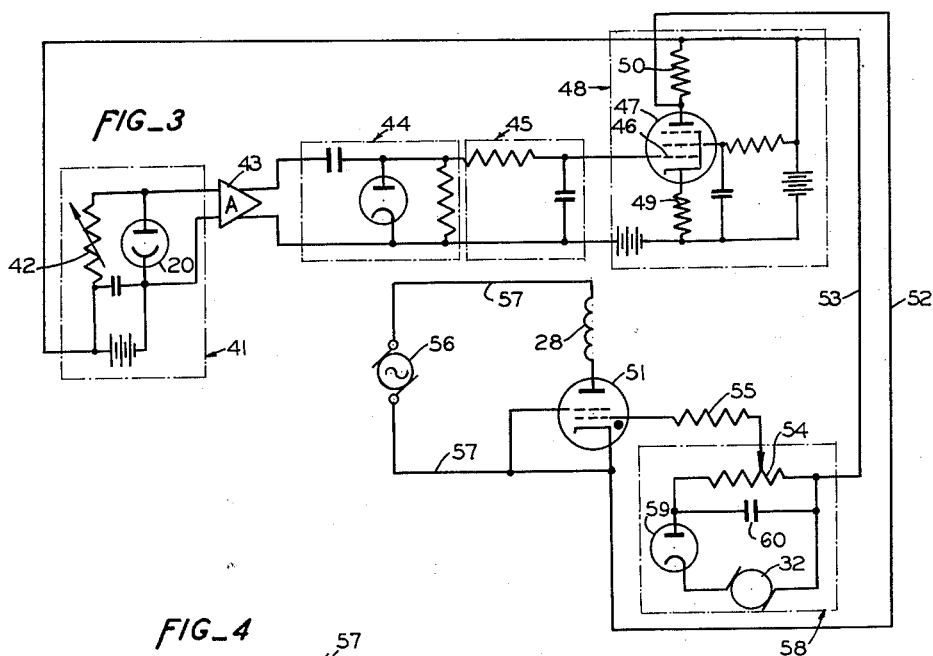
FIG_3
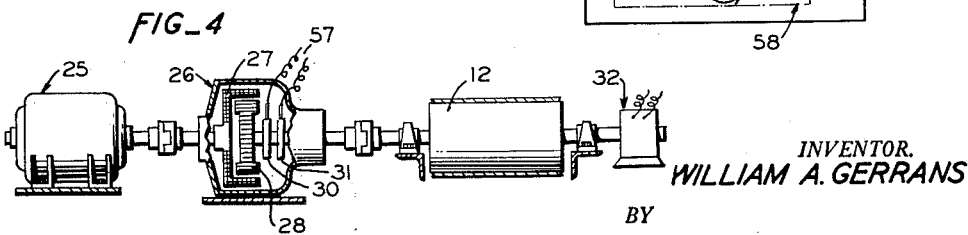
FIG_4
INVENTOR.
WILLIAM A. GERRANS
BY
Boyken, Mohler & Wood
ATTORNEYS Dec. 27, 1960  W. A. GERRANS  2,966,253
VARIABLE SPEED DRIVE CONTROL FOR MATERIAL HANDLING
Filed Sept. 19, 1955  2 Sheets-Sheet 2
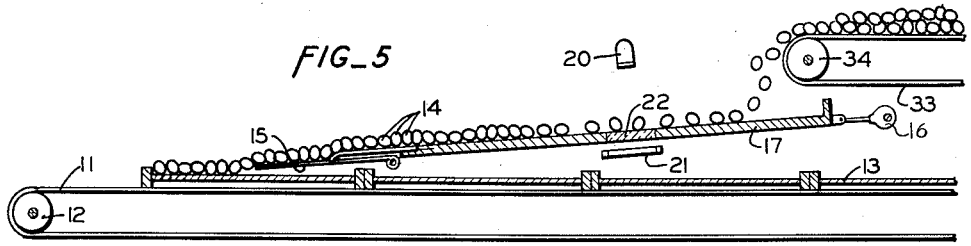
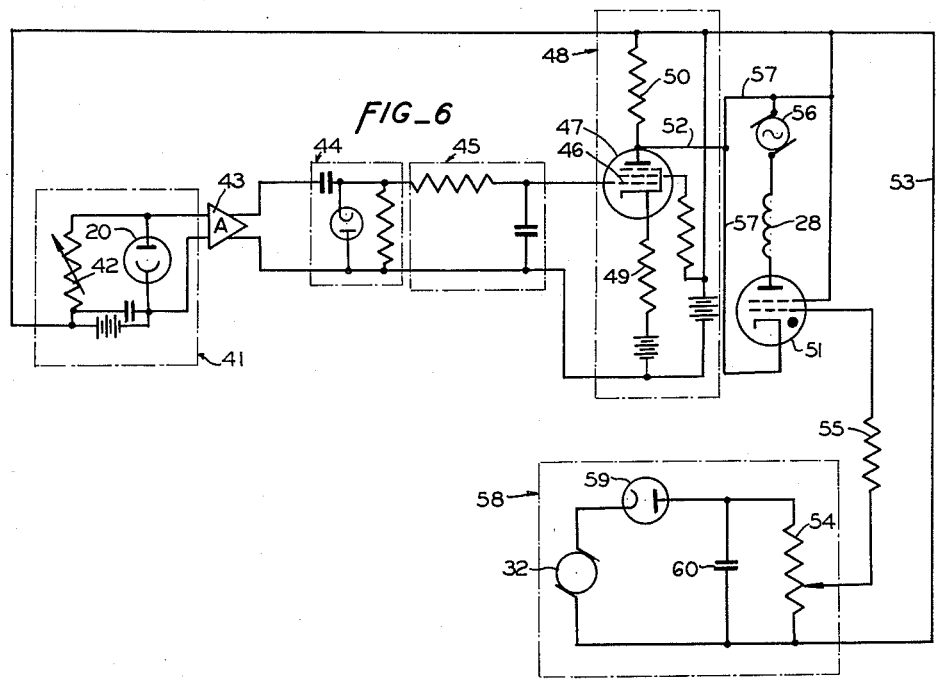
INVENTOR.
WILLIAM A. GERRANS
BY
Boyken, Mohler & Wood
ATTORNEYS

United States Patent Office 2,966,253
Patented Dec. 27, 1960

2,966,253

VARIABLE SPEED DRIVE CONTROL FOR MATERIAL HANDLING

William A. Gerrans, 15 Florimond Drive, Colusa, Calif.

Filed Sept. 19, 1955, Ser. No. 535,115

6 Claims. (Cl. 198—37)

The present invention relates to a variable speed drive in which the speed of a conveyor or feeder is controlled as a function of the density of material being conveyed. Said density varies the light received by a photoelectric tube and the resulting conductivity changes of said tube are translated by an electronic circuit to vary the speed output of an eddy current clutch driving such conveyor.

There have been many circuits devised for the control of conveyors and material feeders as a function of photoelectric sensing. However, many of these devices have been based upon a counting operation which is not needed in the form of the present invention. Other such circuits have not been as stable as it is desirable to have them. Complexity has been a drawback of many of the prior devices. Poor speed regulation has been another defect.

The present invention is particularly adapted for use with a tray loader such as shown in the patent to William L. Gerrans, Jr., 2,133,442, October 18, 1938, 214–2, and notably when such loader is used for placing fruit such as prunes.

Having in mind these defects of the prior art, it is an object of the present invention to provide control system for a conveyor or feeder so that objects handled thereby will be distributed at a desired density.

Another object of the present invention is to provide a control for an eddy current clutch, which control will be highly responsive to a sensing operation but stable and non-hunting in its operation.

A further object of this invention is the provision of a satisfactory electronic link between a photoelectric tube and a torque controlling field.

Another object of the present invention is the provision in an electronic circuit of a feed-back from a mechanical driven member, and which feed-back has the quality of an inertia, flywheel effect.

A further object of the present invention is that of maintaining a desired concentration of material being processed at a particular place by varying either the rate at which material is supplied or taken away from such place.

The above mentioned defects of the prior art are remedied and objects achieved by sensing the density of material at a particular place in a process by means of a photoelectric tube or phototube. By the use of the term "density" is meant the distribution density of discrete particles or of liquids or gases, not the relative density or weight per unit volume. The voltage generated by the phototube is amplified and impressed on a grid of a valve in the circuit of the field coil of an eddy current clutch controlling the torque drive of a conveyor or feeder taking the material to or from the plate at which its density is being sensed. A generator is driven with or by the conveyor, and the output of the generator is, also, impressed on the grid of the valve to stabilize the operation of the phototube, amplifiers, and conveyor drive.

Conveyors, conveyor drives, and electronic circuits as outlined above are hereinafter described in detail and depicted in the accompanying drawings, in which:

Figs. 1 and 2 each show a controlled speed conveyor for trays associated with a hopper and a feeder for the transfer of material from the hopper to the trays with each figure having a different arrangement of phototube and light source;

Fig. 3 is a diagram depicting all of the electrical parts of one form of the invention;

Fig. 4 is a showing of the conveyor drive;

Fig. 5 shows a conveyor for trays associated with a feeder and a controlled speed conveyor delivering material to the feeder, another form of the invention; and, Fig. 6 is a diagram depicting all of the electrical parts of the form of the invention of Fig. 5.

In Fig. 1 there is shown a portion of an endless belt conveyor 11 having a drive drum 12. This conveyor carried trays 13 from right to left, upon which trays fruit such as prunes 14 is placed by a feeder 15. This feeder may be of the type disclosed in Gerrans, supra, which, at its left end, reciprocate parallel to the trays to deliver and compact the fruit onto the trays. The material, from a hopper 18, is delivered by an incline 17 that is driven by an eccentrically rotating shaft 16. The flow from the hopper may be controlled by any suitable means. Dependent upon the speed of the conveyor 11, material will back up on the incline and cover it to a greater or lesser extent. It is the density of the material on the incline as it goes to the feeder and conveyor that is sensed by a phototube 20 located above and adjacent the incline. The above named parts are the same in the showing of both Figs. 1 and 2.

Light for the phototube 20 in Fig. 1 is furnished by a light source 21 located below the incline 17 and passing through a transparent sheet 22 in the plane of and forming a part of the incline 17. The intensity of this light is varied by the density of the fruit, or material, on the transparent sheet, and it is this variation in light intensity that is sensed by the phototube 20.

In Fig. 2, the light source 23 is located above the incline 17 and is reflected from the fruit to the phototube 20. In either the Fig. 1 or the Fig. 2 form, suitable light filters 24 may be used. With different relative locations of light source and phototube as shown in these figures, different adjustment of light intensity, filters, and electronic circuits must be made to obtain proper functioning, but these adjustments are deemed to be within the skill of the art and are not here discussed.

Before discussing the circuit diagram of Fig. 3, reference is made to Fig. 4 which shows a variable speed drive for the conveyor 11. This drive is not only used for the conveyor 11 of Figs. 1, 2 but for the input conveyor of Fig. 5, and may be used for driving the eccentric feeder shaft 16 alone or in parallel with the mentioned conveyors. Power for conveyor is furnished by a prime mover 25 such as an induction motor coupled to an eddy current clutch 26, having an input drum 27 and an output rotor carrying a field coil 28. The motor and input drum rotate at a constant speed. Control of the output speed of the clutch is had by varying the slippage between input and output. This is a function of the current flow in the field winding 28. Each end of the field coil is connected to a slip ring 30, 31. The output of the clutch is connected to the conveyor drive drum 12. A voltage generator 32 is driven by the conveyor drum 12, or the generator may be an integral part of the clutch 26.

It may be well at this point to consider Fig. 5, which shows the same tray carrying conveyor 11 as in Figs. 1, 2, and the same phototube 20 and light source 21 but a different material input means such as the moving belt 33 and its drive drum 34. It is the purpose of this embodiment of the invention to vary the speed of the belt 33 by means of the drive shown in Fig. 4. The density of the fruit on the incline 17 is controlled by varying the speed of this input belt 33 instead of the output belt 11.

Figs. 3, 6 are diagrams of different circuits for linking the phototube 20 with the field winding 28 of the eddy current clutch 26 and the generator 32. The components of the two circuits are shown as similar but they may be the same with the difference being only that the circuit of Fig. 3 is intended to reduce the current in the field winding 28 of the clutch as the light intensity to the phototube 20 increases to thereby slow down the conveyor drive 11, while in the circuit of Fig. 6, an increase in light intensity increases the speed of the input conveyor 34.

In these circuits of Figs. 3 and 6, a phototube unit 41 contains the phototube 20 and a variable resistor 42 which allows an adjustment of the tube in accordance with variations in the color of the material 14 being sensed, and in accordance with other factors than material density which may affect the light intensity received by the tube. The phototube circuit 41 modulates an amplifier 43. The output of the amplifier is rectified by a rectifier 44 and smoothed by a filter 45.

The rectifier is poled so that a negative biasing voltage is delivered to the control grid 46 of a pentode 47 in a monitor circuit 48. Control of the pentode is had by increasing the negative bias to reduce the conductivity of the tube. In series with the tube is a current limiting resistance 49 and an output resistance 50. The voltage drop across the pentode output is impressed on the control grid of a thyratron tube 51. The negative side of the load 50 is connected by a lead 52 to the cathode of the thyratron, and the positive side of the load is connected to the grid by a lead 53, voltage divider 54, and resistance 55. Power is supplied to the thyratron from a source 56 through leads 57 in series with the field coil 28 of the eddy current clutch 26. The generator circuit 58 includes the generator 32 driven in direct relation with the belt 11, and the voltage divider 54 in series therewith. If the generator produces alternating current it is rectified by a rectifier 59 and condenser 60.

The grid voltage on the thyratron 51 will be a direct function of the conveyor speed and an indirect function of the density of the material being sensed. This functioning is obtained by adjustment of the various controls such as the resistor 42 in the phototube circuit 41 and the voltage divider 54. As the light intensity to the phototube 20 incearses, the negative bias on the grid 46 of the pentode 47 will become more negative to reduce the current in the monitor circuit 48. This reduces the conductivity of the thyratron valve 51 and reduces the flux in the eddy current clutch 26 to effect a reduction in belt 11 speed. This reduction is stabilized by the belt inertia as transmitted to the control of the thyratron 51 by the generator 32, and by the inertia of the generator circuit 58. This form of the control circuit is particularly adapted for use with the material handling mechanisms of Figs. 1, 2 to control the drive of belt 11. As the density of material under the phototube decreases the speed of conveyor 11 will decrease.

In Fig. 6 it will be noted that the poling of the rectifier 44 has been reversed from that of Fig. 3 to give a positive bias on the grid 46 of the pentode 47. Thus, with an increase in the light intensity received by the phototube 20, the conductivity of the monitor circuit 48 will be increased, the control of the valve 51 will go more positive to increase the flux in the eddy current clutch 26, and the speed of conveyor 33 will increase. This control circuit form is particularly adapted for use with the material handling arrangement of Fig. 5 to control the speed of the material feed belt 33 by driving the drum 34 from the mechanisms of Fig. 4. Thus, in Fig. 5, a reduction in material density under the phototube 20 will result in an increase in the speed of the belt 33 to effect a delivery of more material to the phototube station.

It will be apparent to those skilled in the electronic circuit art the various adjustment to be made in the disclosed circuits to obtain the indicated desired operations. Further, the values of the various circuits and their components will be apparent. The various biasing voltages are a function of the circuits including the voltage of the indicated power sources, and line and component impedances.

Having thus disclosed the construction and operation of various forms of my invention, I claim:

1. A conveyor drive and control, comprising: a conveyor, a drive for said conveyor including a variable speed device having a wound field coil, a photoelectric device arranged to sense the distribution density of the material moved by said conveyor, amplifying means for the output of said photoelectric device, a feed back generator in drive with said conveyor, a power source for and connected in series with said field coil, a valve in series with said source, said valve having controls therefor adapted to determine the amount of current through said field coil, and connections for impressing the output of said means and said generator on said controls.

2. A conveyor drive and control, comprising: a conveyor, a drive for said conveyor including a variable speed device having a wound field coil, a photoelectric device arranged to sense the distribution density of material moved by said conveyor, amplifying means for the output of said photoelectric device, a feed-back generator in drive with said conveyor, a power source for and connected in series with said coil, a valve in series with said source, said valve having controls therefor adapted to determine the amount of current through said field coil, and connections for impressing the output of said means and said generator on said controls, said amplifying means including a negative bias amplifier so that the output of said means and the field produced by said coil are an indirect function of the current in said tube.

3. A conveyor drive and control, comprising: a conveyor, a drive for said conveyor including an eddy current clutch having a would field coil, a photoelectric tube arranged to sense the distribution density of material moved by said conveyor, amplifying means for the output of said tube, a feed-back generator in drive with said conveyor, a power source for and connected in series with said coil, a valve in series with said source, said valve having controls therefor adapted to determine the amount of current through said field coil, and connections for impressing the output of said means and said generator on said controls, said amplifying means including a positive bias amplifier so that the output of said means and the field produced by said coil are a direct function of the current in said tube.

4. A fruit feeder, comprising: a tray conveyor, a feeder apron above, close to, and angled to intersect said conveyor, an inclined chute acting as a continuation of said apron and adapted to convey fruit to said apron, means for driving said chute so that its end closest to said feeder apron has reciprocatory movement parallel to said conveyor, drive means for said conveyor, and sensing means responsive to the distribution density of fruit on said chute for controlling the speed of said conveyor drive means as a continuous proportionate function of such density, said sensing means including a photoelectric device, and the speed of said drive means being a function of the light received by said photoelectric device.

5. A control arrangement for feeding fruit or the like which comprises means providing a surface across which the fruit is adapted to move and on which the fruit becomes compacted to a degree determined by the rates of delivery thereto and removal therefrom, means for removing fruit from said surface including a conveyor, a continuously variable drive for said conveyor whereby the rate of removal of fruit from the surface and the distribution density of the fruit on said surface are made variable, means for sensing the distribution density of the fruit on said surface, and means for varying said conveyor drive in proportion to the the sensed distribution density.

6. A control arrangement for feeding of fruit or the like which comprises means for distributing fruit in a single layer including an incline reciprocated so as to move the fruit downwardly thereacross while distributing the fruit in such single layer, the fruit tending to compact on said incline upwardly thereof, means for receiving fruit discharged from the lower end of said incline including a conveyor having a variable speed drive, means for sensing the distribution density of fruit on said incline, and means for varying the speed of said conveyor proportionally to the sensed distribution density.

References Cited in the file of this patent

UNITED STATES PATENTS

| 1,851,215 | Schunemann | Mar. 29, 1932 |
| 1,945,652 | Martin | Feb. 6, 1934 |
| 2,103,400 | Weckerly | Dec. 28, 1937 |
| 2,221,396 | Evoy | Nov. 12, 1940 |
| 2,449,779 | Jaeschke | Sept. 21, 1948 |
| 2,609,965 | Kast | Sept. 9, 1952 |
| 2,656,845 | Lindsay | Oct. 27, 1953 |

FOREIGN PATENTS

| 703,492 | Great Britain | Feb. 3, 1954 |